US012234689B2

(12) United States Patent
Blake

(10) Patent No.: US 12,234,689 B2
(45) Date of Patent: Feb. 25, 2025

(54) LADDER-MOUNTED LEDGE FOR HOLDING TOOLS AND MATERIALS

(71) Applicant: David Hural Blake, Harrisburg, PA (US)

(72) Inventor: David Hural Blake, Harrisburg, PA (US)

( * ) Notice: Subject to any disclaimer, the term of this patent is extended or adjusted under 35 U.S.C. 154(b) by 0 days.

(21) Appl. No.: 18/775,103

(22) Filed: Jul. 17, 2024

(65) Prior Publication Data

US 2024/0392626 A1 Nov. 28, 2024

Related U.S. Application Data

(60) Provisional application No. 63/562,584, filed on Mar. 7, 2024.

(51) Int. Cl.
*E06C 7/14* (2006.01)

(52) U.S. Cl.
CPC .................................... *E06C 7/14* (2013.01)

(58) Field of Classification Search
CPC ........................................................ E06C 7/14
USPC ................................................ 248/238, 210
See application file for complete search history.

(56) References Cited

U.S. PATENT DOCUMENTS

| | | | | | |
|---|---|---|---|---|---|
| 3,422,923 | A * | 1/1969 | Lund | E06C 7/14 | 182/20 |
| 4,730,802 | A * | 3/1988 | Chatham | B25H 3/06 | 248/238 |
| 5,275,256 | A * | 1/1994 | Ellzey | E06C 7/14 | 104/246 |
| 5,342,008 | A * | 8/1994 | Kay | E06C 7/14 | 248/210 |
| 5,370,263 | A * | 12/1994 | Brown | E06C 7/14 | 220/756 |
| 5,584,357 | A * | 12/1996 | Gugel | E06C 7/182 | 248/238 |
| 5,782,314 | A * | 7/1998 | Zeitler | E06C 7/14 | 248/210 |
| 5,913,380 | A * | 6/1999 | Gugel | E06C 7/14 | 248/210 |
| 6,341,666 | B1 * | 1/2002 | Allen | E06C 7/14 | 248/238 |
| 7,032,711 | B1 * | 4/2006 | Katz | B25H 3/06 | 248/238 |
| 7,370,726 | B1 * | 5/2008 | Chavez | E06C 1/18 | 248/210 |

(Continued)

*Primary Examiner* — Kimberly T Wood
(74) *Attorney, Agent, or Firm* — Novel Patent Services

(57) ABSTRACT

A ladder-mounted ledge used for holding tools and materials. The ladder-mounted ledge provides a stable work surface, which minimizes the frequency of ascents and descents and facilitates efficient access to the tools and materials while using a ladder. The ladder-mounted ledge reduces the risk of falls during accessing the tools and materials, for example, various work tools, power tools, screwdrivers, and thereof. An embodiment of a first aspect, the ladder-mounted ledge comprises a body having an opening defined therein, a top surface, and a bottom surface. The body is configured to be removably attached to a ladder through the opening, with a ladder head positioned above the top surface of the body and ladder rungs positioned below the bottom surface of the body. The user can use the ladder-mounted ledge according to user preferences and application requirements.

18 Claims, 8 Drawing Sheets

(56) References Cited

U.S. PATENT DOCUMENTS

| | | | | |
|---|---|---|---|---|
| 8,596,454 B1 * | 12/2013 | Carlson | B25H 3/06 | |
| | | | 248/210 | |
| 8,925,685 B2 * | 1/2015 | Dufour | E06C 7/14 | |
| | | | 248/210 | |
| 9,428,958 B1 * | 8/2016 | Ellis | E06C 7/14 | |
| 2004/0163891 A1 * | 8/2004 | Craig | E06C 7/16 | |
| | | | 248/238 | |
| 2009/0032662 A1 * | 2/2009 | Parrott | E06C 7/14 | |
| | | | 248/238 | |
| 2012/0175329 A1 * | 7/2012 | Johnson | E06C 7/14 | |
| | | | 29/428 | |
| 2016/0153235 A1 * | 6/2016 | Villar | E06C 7/14 | |
| | | | 220/475 | |

* cited by examiner

LADDER-MOUNTED LEDGE FOR HOLDING TOOLS AND MATERIALS

The present disclosure relates generally to a ladder-mounted tray for holding tools and materials, and more particularly to a ladder-mounted tray for holding tools and materials that provides a stable work surface, thereby minimizing the frequency of ascents and descents and facilitating efficient access to tools and materials.

BACKGROUND

Ladders are indispensable tools for a myriad of applications, ranging from routine household operations to substantial construction endeavors. They serve as an ostensibly straightforward means of accessing elevated areas. Nevertheless, traditional ladders are encumbered by inherent constraints that can compromise safety and user satisfaction.

One significant issue pertains to the absence of a designated work surface. When climbing up or down a ladder, carrying tools and materials can be quite challenging in terms of ergonomics and stability. Holding onto tools can make it difficult to maintain the necessary "three-point contact" with the ladder (two hands and one foot), increasing the risk of slipping and falling.

Some ladder manufacturers provide ladders with flip-down shelves, but these shelves are often small and not very durable. When it comes to bucket attachments, they can help provide a container, but the act of reaching in and out can be quite challenging, particularly when the ladder is positioned at a considerable height. While bucket attachments provide some storage capacity, their size can affect the ladder's stability by widening its center of gravity. Moreover, reaching for tools from a bucket at a height can lead to awkward postures, causing strain and potential loss of balance. Although tool belts offer a hands-free solution for carrying tools, the added weight on one hip can result in muscular fatigue and imbalances, impacting balance and increasing the risk of falling.

Ladder manufacturers have attempted to address the issue of tool carrying by offering detachable trays. However, these solutions often fall short in terms of integration, user experience, and safety. A ladder with a separate detachable tray is present in market. The detachable tray is mounted on the ladder in any one of a variety of ways. The detachable tool tray is a separate component designed to integrate with the ladder structure. Mounting mechanisms can vary, offering flexibility based on user preference and application requirements. Certain designs utilize openings within the rungs themselves. The tray hooks or slots into these designated openings, providing a secure platform for tools. Brackets or fasteners can be attached directly to the rungs or ladder head. The tool tray then connects and locks onto these dedicated attachment points. Some designs incorporate grooves or tracks directly into the side rails. The tool tray slides and locks into these channels for secure positioning. Hybrid designs can combine elements of the aforementioned methods, leveraging rung openings, brackets, and side rail tracks for enhanced stability and load capacity. Generally, a user climbs to the upper end of the ladder to perform work. On a standard ladder there is nothing at the upper end of a ladder for carrying tools.

The primary function of the detachable tool tray is to provide a readily accessible platform for tools and materials while the user is positioned on the ladder. This eliminates the need to constantly climb up and down to retrieve necessary items, improving efficiency and reducing the risk of falls.

Many attempts have been made to provide some form of ladder tray for attachment to the upper end of the ladder for holding tools and materials. It is necessary for the user to position the ladder and climbed to the top to attach the ladder tray. Prior art devices require the user climbed to the top of the ladder and use fasteners or tools to attach a ladder tray.

Therefore, there is a need for a more secure and ergonomically optimized solution for users of ladders. There is also a need for a convenient tool and material holder that offers a stable work surface. There is also a need for a ladder-mounted tray that reduces the need for frequent climbing up and down the ladder, making tools and materials easily accessible and work more efficient.

SUMMARY OF THE INVENTION

The following presents a simplified summary of one or more embodiments of the present disclosure to provide a basic understanding of such embodiments. This summary is not an extensive overview of all contemplated embodiments and is intended to neither identify key nor critical elements of all embodiments, nor delineate the scope of any or all embodiments.

The present disclosure, in one or more embodiments, relates to a ladder-mounted tray or ledge that provides effective safety for a user. An embodiment of a first aspect, the ladder-mounted ledge comprises a body having an opening defined therein, a top surface, and a bottom surface. The body is configured to be removably attached to a ladder through the opening, with a ladder head positioned above the top surface of the body and ladder rungs positioned below the bottom surface of the body.

An embodiment of the first aspect, a plurality of slots are created on the body for securely holding a plurality of items. The slots comprise a shape including, but not limited to, a circle, triangle, square, rectangle, oval, and diamond. The slots are configured to hold the items. The items include, but are not limited to, various work tools, power and hand tools such as screwdrivers, hammers, and paint brushes.

An embodiment of the first aspect, one or more accessory holes are created on the body. The accessory holes are configured to receive and securely hold a mountable accessory through a fastening assembly. The fastening assembly comprises, but is not limited to, one or more connectors, nuts and bolts, clamps hooks, and threaded inserts. The fastening assembly is configured to enable a user to detachably connect the mountable accessory to the accessory holes. The mountable accessory is configured with at least one compartment to hold at least one accessory. The accessory includes, but is not limited to, a paint can, and other articles. The fastening assembly is configured to enable a user to detach and connect the current mountable paint accessory using the two accessory holes which are available for future attachments.

An embodiment of the first aspect, a support assembly is disposed on the bottom surface of the body. The support assembly is configured to secure the body to the ladder and prevent movement of the ladder relative to the body. The body is made of a material including, but not limited to, plastic, metal, glass, and wood.

In a preferred embodiment, the support assembly comprises one or more locking units and a ladder support brace. The locking units are configured to interlock with at least one rung of the ladder, thereby preventing movement of the ladder-mounted ledge. The locking units comprise, but are not limited to, clamps, clips, and latches thereof. The ladder support brace is configured to engage with a ladder cross brace of the ladder, thereby preventing movement of the ladder-mounted ledge.

An embodiment of a second aspect, an adjustable ladder-mounted ledge comprises a body having an opening defined therein, a top surface, a bottom surface, at least two sections, and at least two extendable platforms. The two sections are adjustably connected to each other through a slider assembly for altering the width of the body and the opening. The extendable platforms are attached to the top surface of the body through the fastening assembly. The extendable platforms are configured to movably connect the two sections with each other. In one embodiment, at least one extendable platform is the mountable accessory. The body is configured to be removably attached to a ladder through the opening, with a ladder head positioned above the top surface of the body and ladder rungs positioned below the bottom surface of the body.

An embodiment of the second aspect, a support assembly is disposed on the bottom surface of the body. The support assembly is configured to secure the body to the ladder and prevent movement of the ladder relative to the body. The body is made of a material including, but not limited to, plastic, metal, glass, and wood. In a preferred embodiment, the support assembly comprises one or more locking units and a ladder support brace. The locking units are configured to interlock with at least one rung of the ladder, thereby preventing movement of the ladder-mounted ledge. The locking units comprise, but are not limited to, clamps, clips, and latches thereof. The ladder support brace is configured to engage with a ladder cross brace of the ladder, thereby preventing movement of the ladder-mounted ledge.

An embodiment of a third aspect, a ladder-mounted ledge comprises a body having an opening defined therein, a top surface, a bottom surface, a front section, and a rear section. The body is configured to be removably attached to a ladder through the opening, with a ladder head positioned above the top surface of the body and ladder rungs positioned below the bottom surface of the body.

An embodiment of the third aspect, a hinge assembly is configured to movably attach the front section to the rear section, thereby allowing the ladder-mounted ledge to change from a fold position to an unfolded position.

An embodiment of the third aspect, a plurality of slots are created on the body for securely holding a plurality of items. The slots comprise a shape including, but not limited to, a circle, triangle, square, rectangle, oval, and diamond. The slots are configured to hold the items. The items include, but are not limited to, various work tools, power and hand tools such as screwdrivers, hammers, and paint brushes.

An embodiment of the third aspect, one or more accessory holes are created on the body. The accessory holes are configured to receive and securely hold a mountable accessory through a fastening assembly. The fastening assembly comprises, but is not limited to, one or more connectors, nuts and bolts, clamp hooks, and threaded inserts. The fastening assembly is configured to enable a user to detachably connect the mountable accessory to the accessory holes. The mountable accessory is configured with at least one compartment to hold at least one accessory. The accessory includes, but is not limited to, a paint can, and other articles.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The accompanying drawings, which are incorporated in and constitute a part of the specification, illustrate an embodiment of the invention, and, together with the description, explain the principles of the invention.

DETAILED DESCRIPTION

Figure 1A:
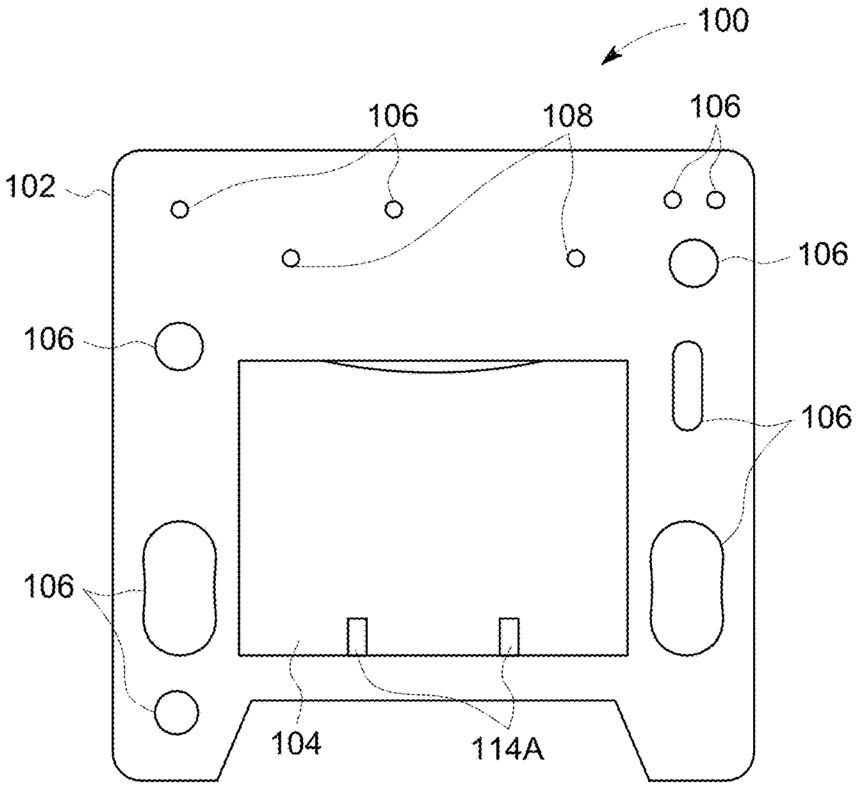
FIG. 1A illustrates a front-top view of a ladder-mounted ledge, in accordance with embodiments of the invention.

Reference will now be made in detail to the present preferred embodiments of the invention, examples of which are illustrated in the accompanying drawings. Wherever possible, the same reference numerals are used in the drawings and the description to refer to the same or like parts.

Figure 1B:
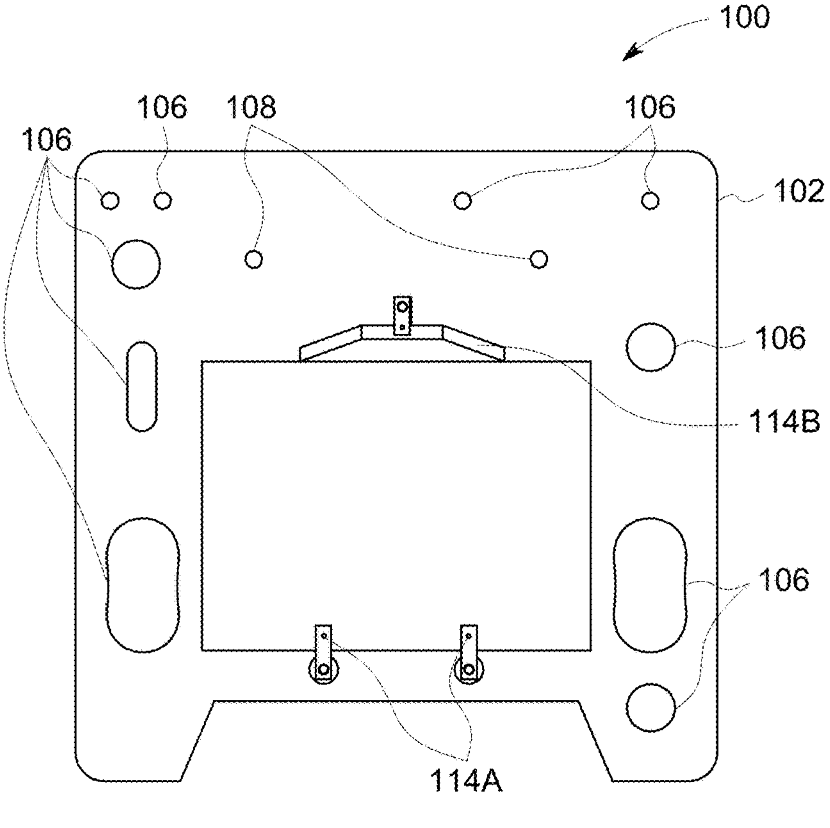
FIG. 1B illustrates a bottom view of the ladder-mounted ledge, in accordance with embodiments of the invention.

FIG. 1A refers to a front-top view of a ladder-mounted ledge or tray 100. FIG. 1B refers to a bottom view of the ladder-mounted ledge 100. In one embodiment, the ladder-mounted ledge 100 comprises a body 102 having an opening 104 defined therein, a top surface, and a bottom surface. The body 102 is configured to be removably attached to a ladder 10 through the opening 104, with a ladder head 12 positioned above the top surface of the body 102 and ladder rungs 14 positioned below the bottom surface of the body 102.

In one embodiment of the first aspect, the body 102 of the ladder-mounted ledge 100 comprises a plurality of slots 106 for securely holding a plurality of items 16. The slots 106 comprise a variety of shapes including, but not limited to, circle, triangle, square, rectangle, oval, diamond, star, heart, and thereof. The slots 106 are configured to securely hold the plurality of items 16. The plurality of items 16 include, but are not limited to, various work tools, equipment, power and hand tools such as screwdrivers, hammers, and paint brushes, etc.

Figure 2A:
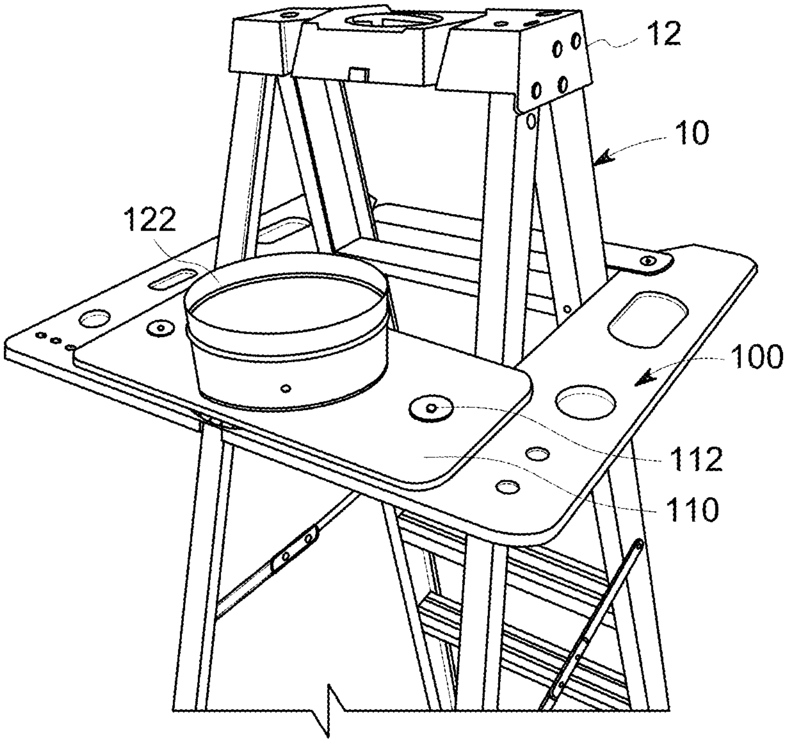
FIG. 2A illustrates a perspective view of the ladder-mounted ledge mounted on a ladder, in accordance with embodiments of the invention.

Referring to FIG. 1B, one or more accessory holes 108 are formed on the body 102. The accessory holes 108 are configured to receive and securely hold a mountable accessory 110 through a fastening assembly 112, as shown in FIG. 2A. The fastening assembly 112 comprises, but is not limited to, one or more connectors, nuts and bolts, clamps hooks, and threaded inserts. The fastening assembly 112 is configured to enable a user to detachably connect the mountable accessory 110 to the accessory holes 108.

Figure 2B:
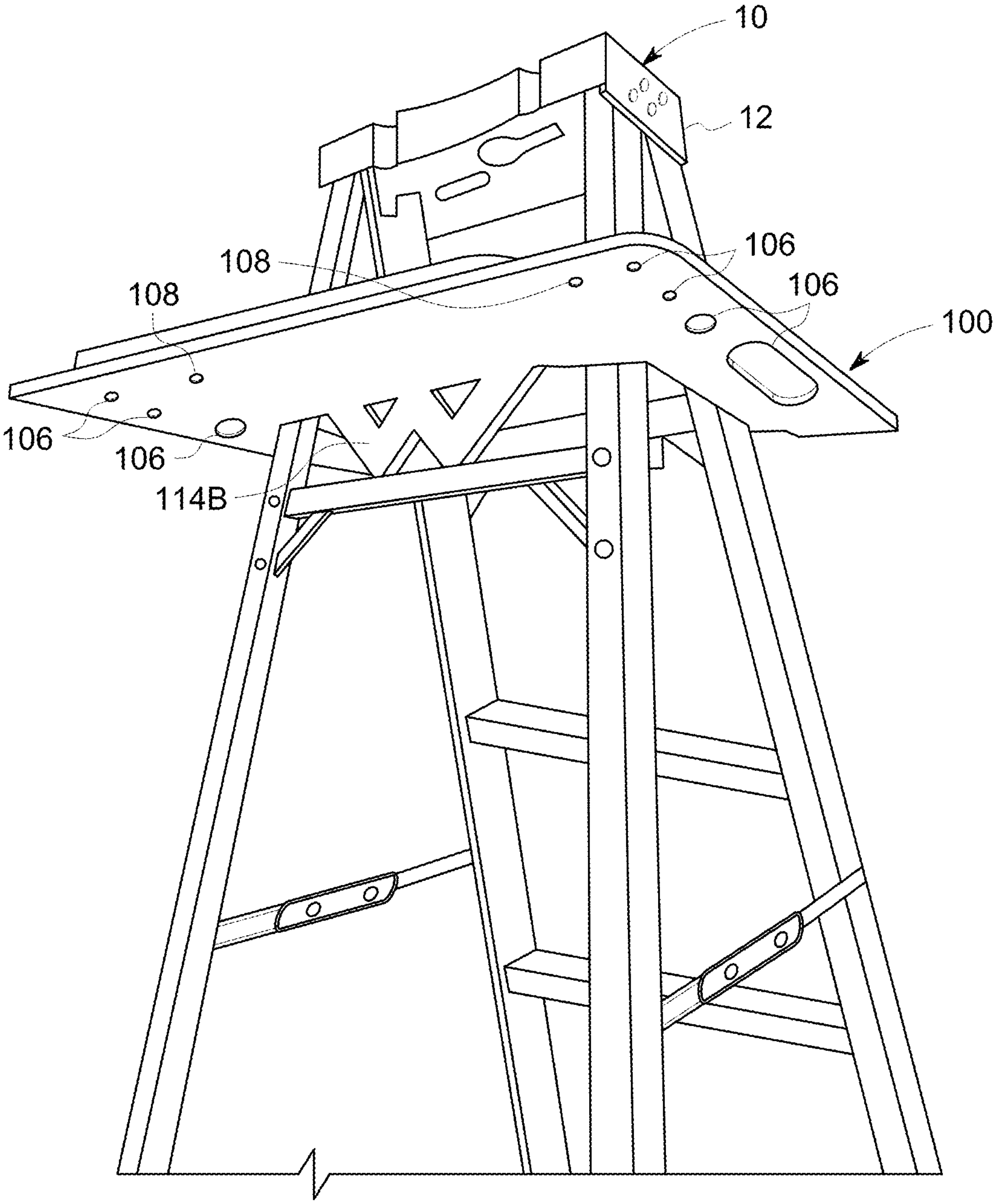
FIG. 2B illustrates a perspective bottom view of the ladder-mounted ledge mounted on the ladder, in accordance with embodiments of the invention.
Figure 2C:
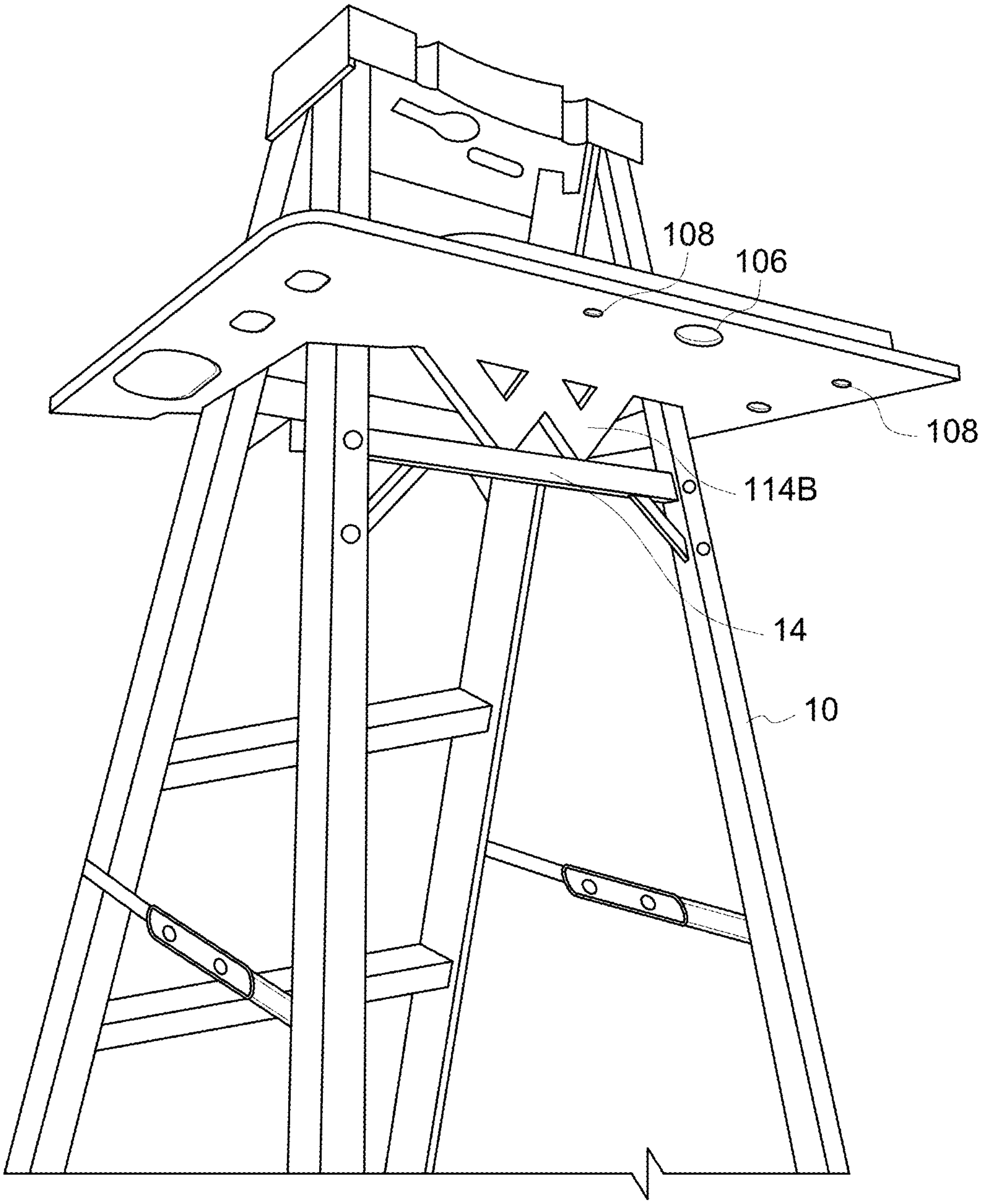
FIG. 2C illustrates a bottom view of the ladder-mounted ledge depicting a ladder support brace, in accordance with embodiments of the invention.

A support assembly (114A, 114B) is disposed on the bottom surface of the body 102, as shown in FIG. 2C. The support assembly (114A, 114B) is configured to secure the body 102 to the ladder 10 and prevent movement of the ladder 10 relative to the body 102. The body 102 is made of a material including, but not limited to, plastic, metal, glass, and wood.

In a preferred embodiment, the support assembly (114A, 114B) comprises one or more locking units 114A and a ladder support brace 114B. The locking units 114A are configured to interlock with at least one rung of the ladder 10, thereby preventing movement of the ladder-mounted ledge 100. The locking units 114A comprise, but are not limited to, clamps, clips, latches, and anti-tip clips. The ladder support brace 114B is configured to engage with a ladder cross brace of the ladder 10, thereby preventing movement of the ladder-mounted ledge 100.

Figure 1C:
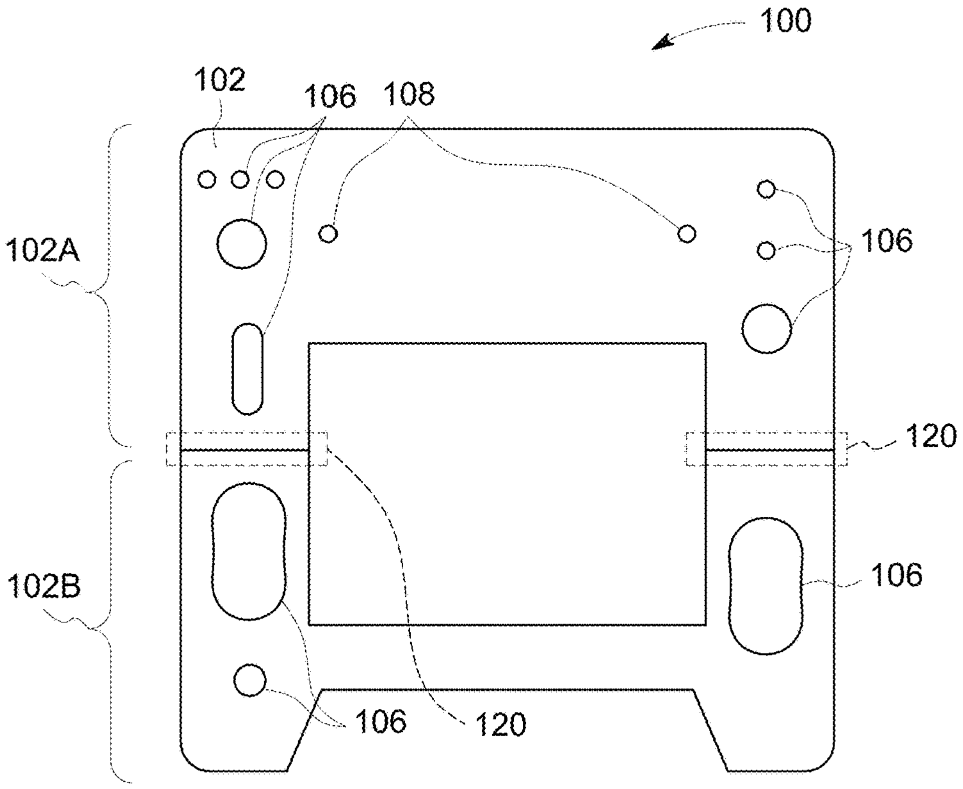
FIG. 1C illustrates a front-top view of a ladder-mounted ledge with a hinge assembly, in accordance with embodiments of the invention.
Figure 1D:
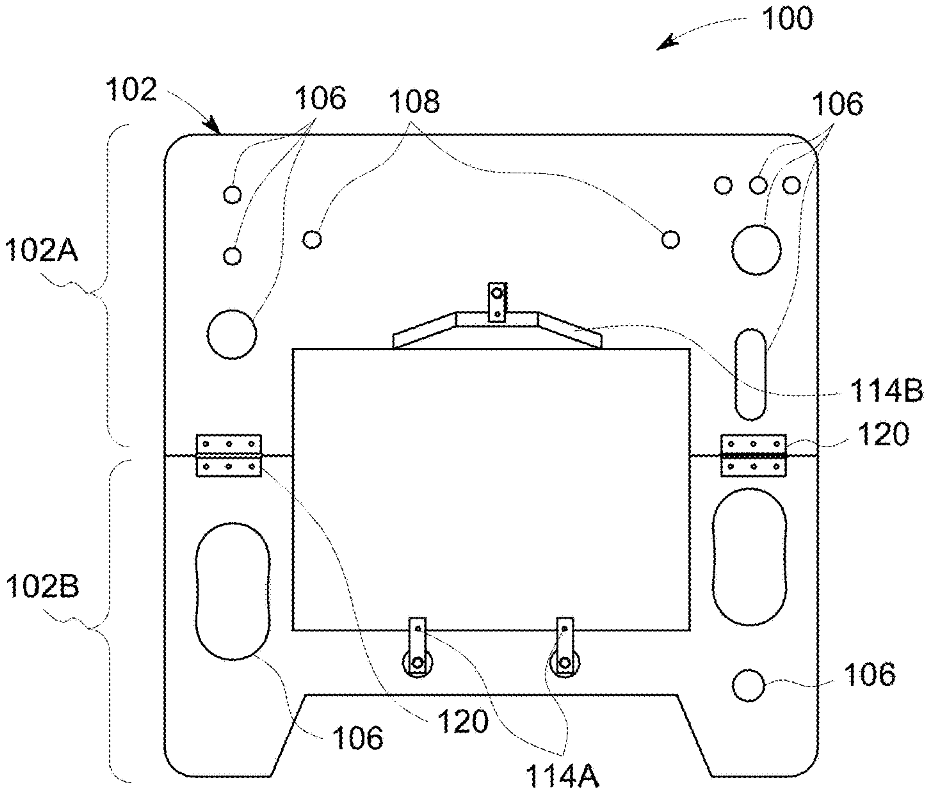
FIG. 1D illustrates a bottom view of the ladder-mounted ledge with the hinge assembly, in accordance with embodiments of the invention.

FIG. 1C refers to a front-top view of another embodiment of the ladder ledge 100 with a hinge assembly 120. FIG. 1D refers to a bottom view of the ladder ledge 100 with the hinge assembly 120. The ladder ledge 100 with the hinge assembly 120 can be referred as a foldable ladder ledge. The ladder ledge 100 comprises a body 102 having an opening 104 defined therein, a top surface, a bottom surface, a front section 102A, and a rear section 102B. The body 102 is configured to be removably attached to the ladder 10 through the opening 104, with the ladder head 12 positioned above the top surface of the body 102 and ladder rungs 14 positioned below the bottom surface of the body 102.

In one embodiment, the hinge assembly 120 is configured to movably attach the front section 102A to the rear section 102B, thereby allowing the ladder ledge 100 to change from a fold position to an unfolded position.

In one embodiment, the body 102 of the ladder ledge 100 comprises the slots 106 for securely holding a plurality of items. The slots 106 comprise a shape including, but not limited to, a circle, triangle, square, rectangle, oval, and diamond. The slots 106 are configured to hold the items 16. The items 16 include, but are not limited to, various work tools, power tools, such as screwdrivers, hammers, paint brushes, and thereof.

Figure 1E:
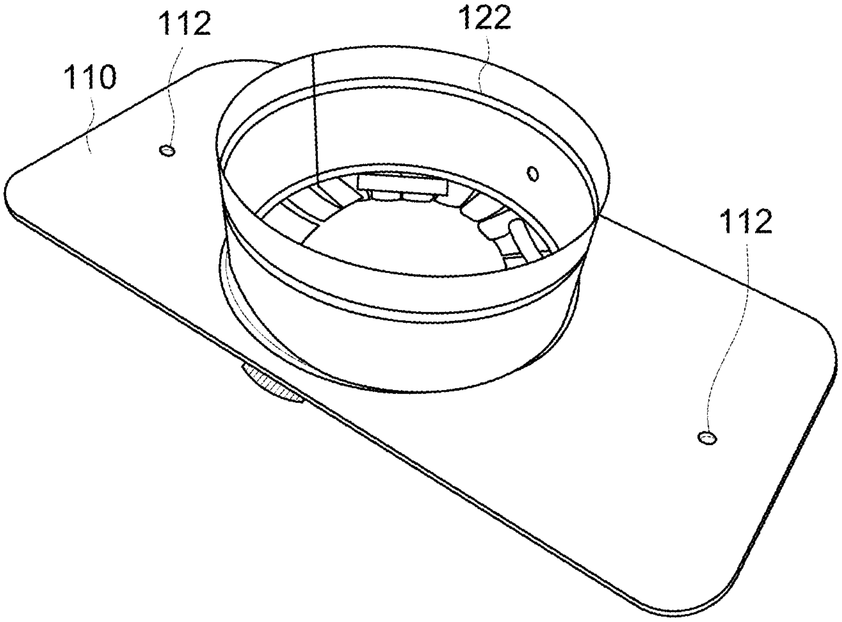
FIG. 1E illustrates a perspective view of a mountable accessory, in accordance with embodiments of the invention.

Referring to FIG. 1E, the mountable accessory 110 is configured with at least one compartment 122 to hold at least one accessory 16. The accessory 16 includes, but is not limited to, a paint can, and other articles.

In one embodiment, the accessory holes 108 are formed on the body 102. The accessory holes 108 are configured to receive and securely hold the mountable accessory 110 through a fastening assembly 112. The fastening assembly 112 comprises, but is not limited to, one or more connectors, nuts and bolts, clamp hooks, and threaded inserts. The fastening assembly 112 is configured to enable a user to detachably connect the mountable accessory 110 to the accessory holes 108. The mountable accessory 110 is configured with at least one compartment 122 to hold at least one accessory. The accessory includes, but is not limited to, a paint can, and other articles.

In one embodiment, the ladder ledge 100 has the body 102 that is movable between a folded position and an extended position, as shown in FIG. 1C and FIG. 1D. The ladder ledge 100 is configured for positioning on a fold down, forward shelf of the ladder 10, as the forward shelf can provide support to the ladder ledge 100. The forward shelf is configured to act as a support platform for the ladder ledge 100, in an unfolded position or extended position.

Referring FIG. 1C and FIG. 1D, the body 102 consists of the front section 102A and the rear section 102B. The front section 102A and the rear section 102B are connected together at a hinge line by the hinge assembly 120, as shown in FIG. 1D. The hinge assembly 120 is configured to allow the body 102 to fold into a foldable position. When folded, the overall size of the ladder ledge 100 reduces considerably. This allows users to easily store or place it in tight spaces, making it highly convenient for compact storage. When the body 102 is unfolded (extended position), the opening 104 is formed.

This foldability can allow for easier transport of and more secure storage of the ladder ledge 10 in, for example, truck boxes, job toolboxes, and other storage containers. The opening 104 is configured to receive a top portion of the ladder 10 and be supported by the ladder 10 in an open position.

As shown in FIG. 1C, when supported by the ladder 10, the body 102 now one piece by installation on the hinge assembly 120 is positioned horizontally or substantially horizontally to, for example, accommodate a variety of tools and materials thereon. In certain embodiments, the opening 104 is located closer to a first side to, for example, reduce any interference with use of ladder steps and maximize ledge space on an opposing second side, while in use with a ladder having a flip-down shelf, it will be appreciated, however, that a foldable ladder ledge frame is provided in any of a variety of suitable shapes and configurations. The foldable ladder ledge is formed from any of a variety of suitable materials as described above for the ladder ledge 10.

In one embodiment, the front section 102A and the rear section 102B include the slots 106 and the accessory holes 108. The slots 106, as shown in FIG. 1C and FIG. 1D, is included in any of a variety of suitable shapes and configurations to secure and/or receive a variety of tools, containers, among other items.

The accessory holes 108 are provided in the body 102 for placement of, for example, an optional paint holder, as shown in FIG. 1C, and/or a variety of other suitable attachments. Flip-down shelves can eliminate the need for the support assembly, as used in FIG. 1D.

Figure 2D:
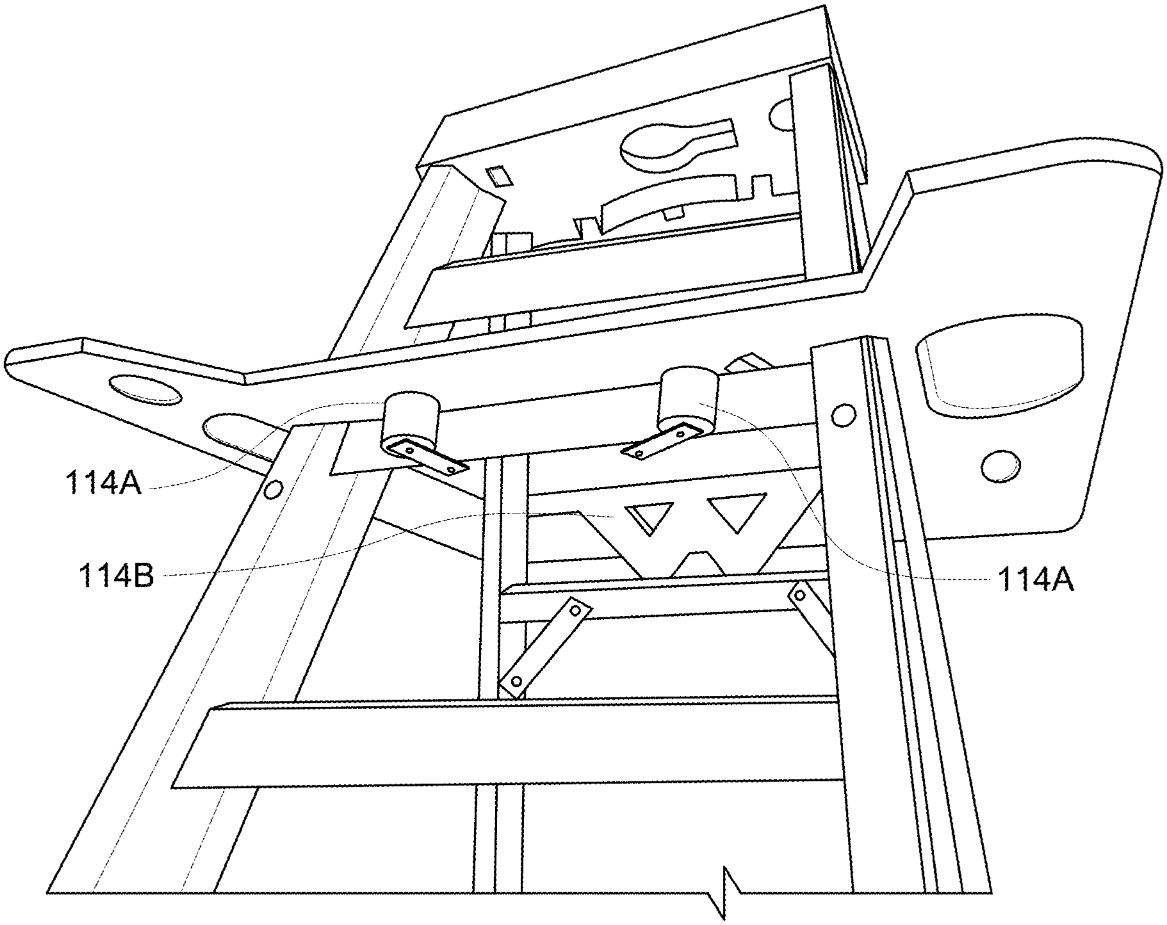
FIG. 2D illustrates a bottom view of the ladder-mounted ledge depicting one or more locking units, in accordance with embodiments of the invention.

FIG. 2A refers to a perspective view of the ladder-mounted ledge 100 mounted on the ladder 10. FIG. 2B refers to a perspective bottom view of the ladder-mounted ledge 100 mounted on the ladder 10. FIG. 2C refers to a bottom view of the ladder-mounted ledge 100 depicting the ladder support brace 114B. FIG. 2D refers to a bottom view of the ladder-mounted ledge 100 depicting the one or more locking units 114A.

Referring to FIG. 2C, the support assembly (114A, 114B) is configured to secure the body 102 to the ladder 10 and prevent movement of the ladder 10 relative to the body 102.

The body 102 is made of a material including, but not limited to, plastic, metal, glass, and wood. In a preferred embodiment referring to FIG. 2D, the locking units 114A are configured to interlock with at least one rung of the ladder 10, thereby preventing movement of the ladder-mounted ledge 100. The locking units 114A comprise, but are not limited to, clamps, clips, latches, and anti-tip clips. The ladder support brace 114B is configured to engage with a ladder cross brace of the ladder 10, thereby preventing movement of the ladder-mounted ledge 100.

Figure 3A:
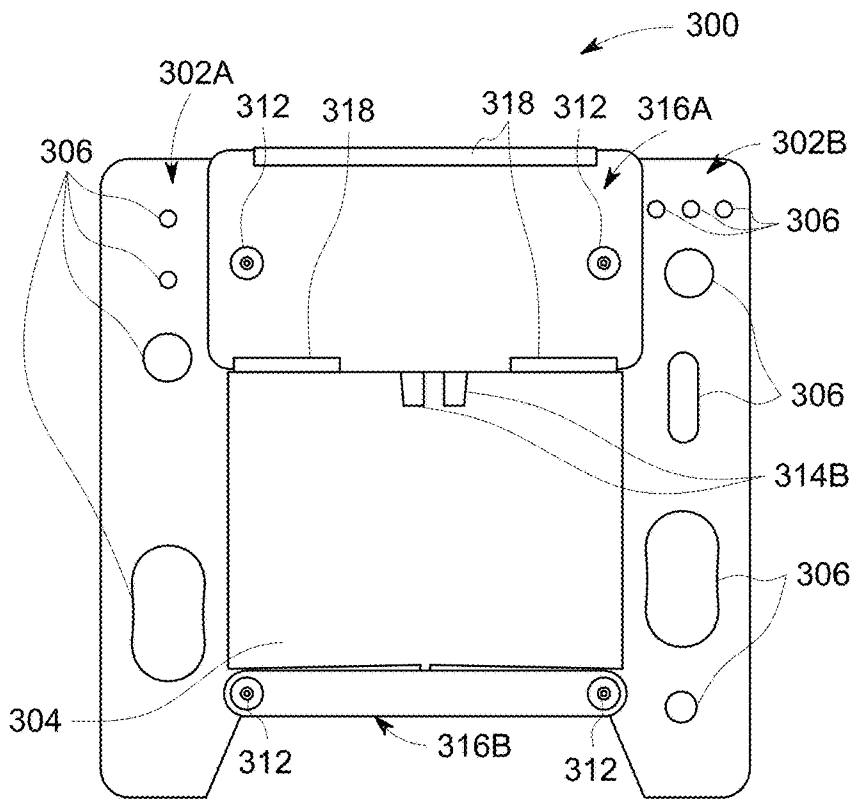
FIG. 3A illustrates a front-top view of an adjustable ladder ledge, in accordance with embodiments of the invention.

FIG. 3A refers to a front-top view of an adjustable ladder ledge 300 according to another embodiment of the invention. In another embodiment herein, the adjustable ladder ledge 300 comprises a body 302 having an opening 304 defined therein, a top surface, a bottom surface, at least two sections (302A, 302B), and at least two extendable platforms (316A, 316B). The body 302 is configured to be removably attached to a ladder 10 through the opening 304, with a ladder head 12 positioned above the top surface of the body 302 and ladder rungs 14 positioned below the bottom surface of the body 302, as shown in FIG. 3C.

The two sections (302A, 302B) are adjustably connected to each other through a slider assembly 318 for altering the width of the body 302 and the opening 304. The extendable platforms (316A, 316B) are attached to the top surface of the body 302 through the fastening assembly 312. The extendable platforms (316A, 316B) are configured to movably connect the two sections (302A, 302B) with each other. In one embodiment, at least one extendable platform 316A is the mountable accessory 310, as shown FIG. 3D.

In another embodiment of the first aspect, the body 302 of the adjustable ladder ledge 300 comprises a plurality of slots 306 for securely holding a plurality of items 16. The slots 306 comprise a shape including, but not limited to, a circle, triangle, square, rectangle, oval, and diamond, etc. The slots 306 are configured to hold the items 16. The items 16 include, but are not limited to, various work tools, equipment, power tools, screwdrivers, hammers, paint brushes, and thereof.

An embodiment of the first aspect, one or more accessory holes 308 are formed on the body 302. The accessory holes 308 are configured to receive and securely hold a mountable accessory 310 through a fastening assembly 312. The fastening assembly 312 comprises, but is not limited to, one or more connectors, nuts and bolts, clamps hooks, and threaded inserts. The fastening assembly 312 is configured to enable a user to detachably connect the mountable accessory 310 to the accessory holes 308. The mountable accessory 310 is configured with at least one compartment 322 to hold at least one accessory 16. The accessory 16 includes, but is not limited to, a paint can, and other articles.

Figure 3B:
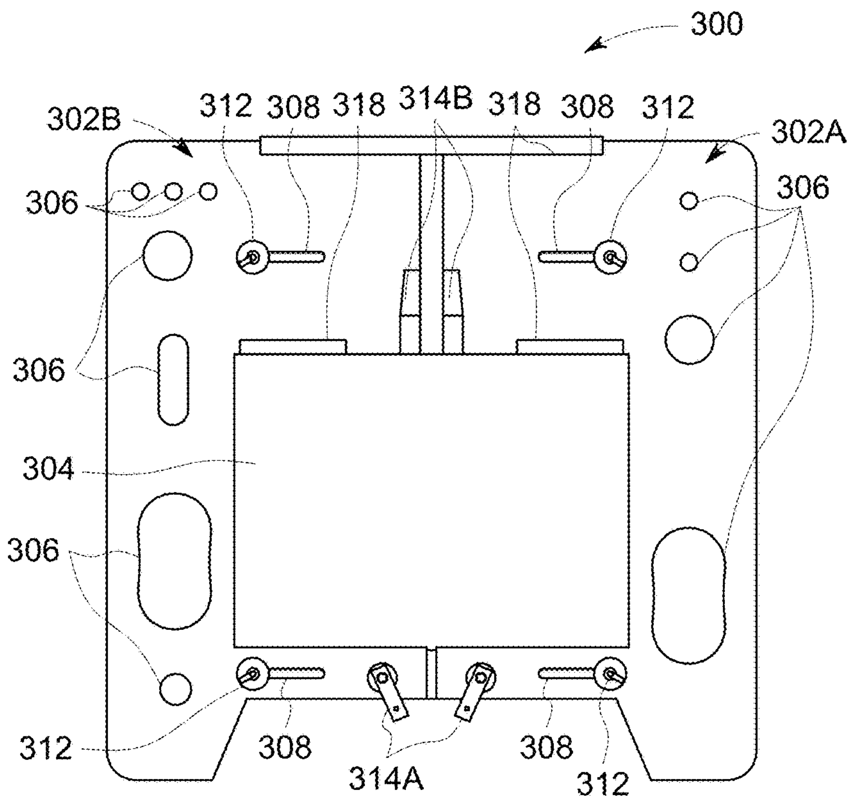
FIG. 3B illustrates a bottom view of the adjustable ladder ledge, in accordance with embodiments of the invention.
Figure 3C:
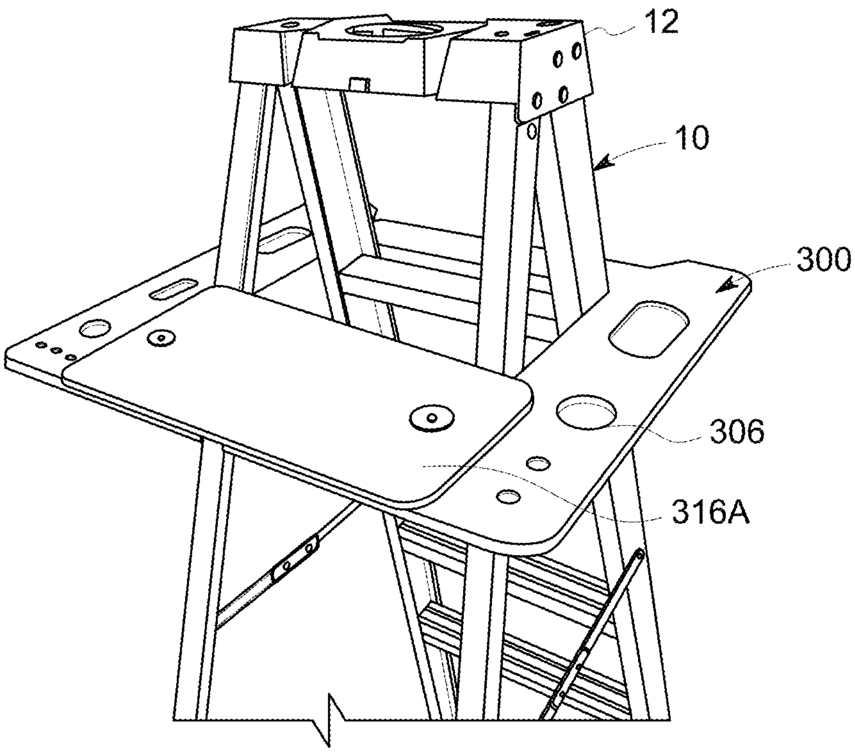
FIG. 3C illustrates a perspective view of the adjustable ladder ledge mounted on a ladder, in accordance with embodiments of the invention.

FIG. 3B refers to a bottom view of the adjustable ladder ledge 300. An embodiment of the first aspect, a support assembly (314A, 314B) is disposed on the bottom surface of the body 302. The support assembly (314A, 314B) is configured to secure the body 302 to the ladder 10 and prevent movement of the ladder 10 relative to the body 302. The body 302 is made of a material including, but not limited to, plastic, metal, glass, and wood.

In a preferred embodiment, the support assembly (314A, 314B) comprises one or more locking units 314A and a ladder support brace 314B. The locking units 314A are configured to interlock with at least one rung of the ladder 10, thereby preventing movement of the adjustable ladder ledge 300. The locking units 314A comprise, but are not limited to, clamps, clips, latches, and anti-tip clips. The ladder support brace 314B is configured to engage with a ladder cross brace of the ladder 10, thereby preventing movement of the adjustable ladder ledge 300.

Referring to FIG. 3A, the two sections (302A, 302B) comprise a left frame section 302A, and a right frame section 302B. The slider assembly 318 integrates and secures the two sections (302A, 302B) and the extendable platforms (316A, 316B). In one embodiment, the slider assembly 318 comprises, but not limited to, one or more slider members designed to slide along designated edges. The slider members are attached to the edges of the two sections (302A, 302B) and the extendable platforms (316A, 316B). The slider members are configured to move along the designated edges. This adjustability allows for precise positioning of the two sections (302A, 302B) relative to each other, potentially enabling customization of the overall size or configuration of the frame 302.

In one embodiment, the extendable platforms (316A, 316B) comprise a top extendable platform 316A, and a bottom extendable platform 316B. The extendable platforms (316A, 316B) may vary in size and shape based on the requirements.

The left frame section 302A and right frame section 302B are connected using the extendable platforms (316A, 316B). These extendable platforms (316A, 316B) are mounted on top of both frame sections (302A, 302B). The extendable platforms (316A, 316B) are configured with one or more through holes that align with corresponding accessory holes 308 present on each frame section (302A, 302B). The fastening assembly 312 is inserted through these holes and accessory holes 308 to secure the frame sections (302A, 302B) together. In one embodiment, the fastening assembly 312 comprises wing nuts that are used to tighten and secure the bolts for a reliable connection.

FIG. 3C refers to a perspective view of the adjustable ladder ledge 300 mounted on the ladder 10. In some embodiments, the opening 304 could be sized to the adjustable ladder ledge 300 to be sufficiently secured on the ladder 10. The left frame section 302A and the right frame section 302B are flat or substantially flat panels. When supported by the ladder 10, the adjustable ladder ledge 300 is positioned horizontally or substantially horizontally to, for example, accommodate a variety of tools and materials. The adjustable opening 304 is configured to receive a top portion 12 of the ladder 10 and be supported by the ladder 10 in an open position. For example, the adjustable ladder ledge 300 is adjusted to fit over the ladder 10 and be supported by the ladder supports 314B. This adjustability of can allow for the adjustable ladder ledge 300 to work with multiple types of ladders (e.g., ladders of different sizes and brands).

In some embodiments, the two sections (302A, 302B) connected through the extendable platforms (316A, 316B) creates the opening 304 that is adjusted from about 14.5 inches to about 17.5 inches wide. In another embodiment, the adjustable ladder ledge 300, and the opening 304 are provided in a wide range of sizes.

In one embodiment, the opening 304 is secured at resting points for the ladder support 314B and the locking units 314A, similar to the way depicted in FIG. 1C and FIG. 1D. Once the adjustable ladder ledge 300 is placed on the ladder 10, the slider assembly 318 is attached to the edges of the left frame section 302A, the right frame section 302B, and the extendable platforms (316A, 316B). This secures them together, enhancing the overall stability of the platform.

In one embodiment, the adjustable ladder ledge 300 comprises the slots 306. The slots 306 is included in any of a variety of suitable shapes and configurations to secure and receive a variety of tools, containers, among other items.

The adjustable ladder ledge 300 further includes the accessory holes 308. In one embodiment, the accessory holes 308 are through holes and/or adjustment accessory holes, is utilized to accommodate any of a variety of attachment accessories.

Figure 3D:
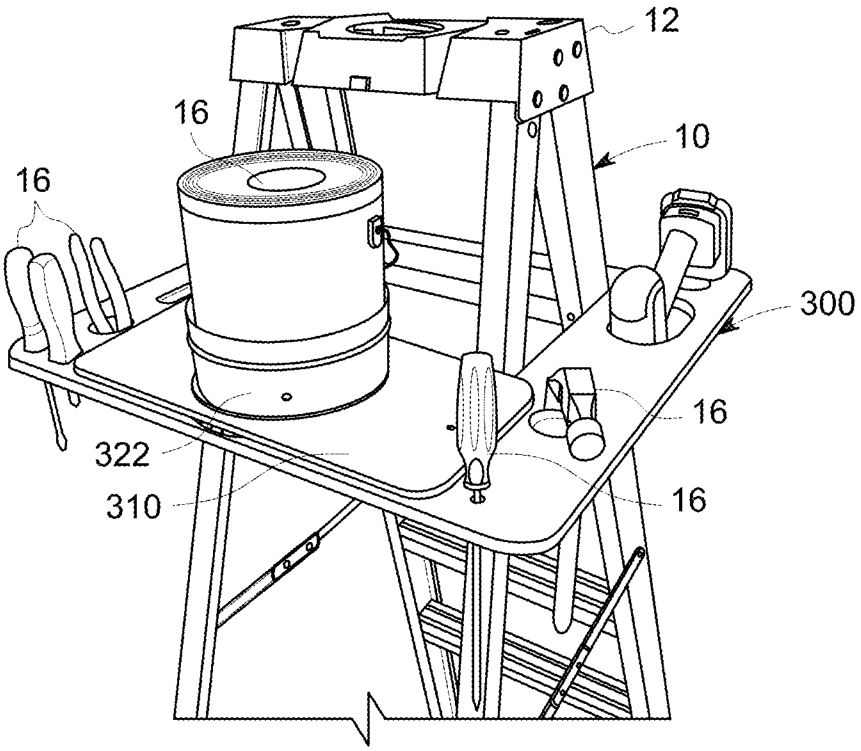
FIG. 3D illustrates a perspective view of the adjustable ladder ledge connected to the mountable accessory and mounted on a ladder, in accordance with embodiments of the invention.

FIG. 3D refers to a perspective view of the adjustable ladder ledge 300 connected to the mountable accessory 310 and mounted on the ladder 10. The ladder ledges described herein further include attachment accessories. For example, and as shown in FIG. 3D, depicts the adjustable ladder ledge 300 includes the mountable accessory 310. The mountable accessory 310 is used with any other ladder ledge described herein, in order to secure a paint pail 16. In use, the mountable accessory 310 is positioned horizontally and attached to, for example, adjustable ladder ledge 300 by using the accessory holes 308. In certain embodiments, the mountable accessory 310 is used as the large extendable platform 316A, as shown in FIG. 3D and allow the adjustable ladder ledge 300 to maintain its adjustability.

In some embodiments, the foldable ladder ledge 100 further includes the support assembly such as anti-tip clips, as described above, for an added secure placement.

In some embodiments, the foldable ladder ledge 100 further comprises a left frame section, a right frame section, and at least two extendable platforms, as described above in FIG. 1A, FIG. 1B. FIG. 1C and FIG. 1D. A slider assembly is configured to integrate and secure the left frame section, the right frame section, and the extendable platforms. In one embodiment, the slider assembly comprises, but not limited to, one or more slider members designed to slide along designated edges. The slider members are attached to the edges of the two sections and the extendable platforms.

The ladder-mounted ledge (100, and 300) provides a stable work surface, which minimizes the frequency of ascents and descents and facilitates efficient access to the tools and materials while using the ladder. The ladder-mounted ledge (100, and 300) reduces the risk of falls during accessing the tools and materials, for example, various work tools, power tools, screwdrivers, and thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

It will readily be apparent that numerous modifications and alterations can be made to the processes described in the foregoing examples without departing from the principles underlying the invention, and all such modifications and alterations are intended to be embraced by this application.

The claimed invention is:

1. A ladder-mounted ledge, comprising:

a body having an opening defined therein, a top surface, and a bottom surface, wherein said body is configured to be removably attached to a ladder through said opening, with a ladder head positioned above the top surface of said body and ladder rungs positioned below a bottom surface of said body;

a plurality of slots disposed on said body for securely holding a plurality of items;

one or more accessory holes disposed on said body, wherein said one or more accessory holes are configured to receive and securely hold a mountable accessory through a fastening assembly; and a support assembly disposed on the bottom surface of said body, wherein the support assembly comprises:

one or more locking units configured to interlock with at least one rung of the ladder, thereby preventing movements of the ladder-mounted ledge during the use; and a ladder support brace configured to engage with a ladder cross brace of the ladder, thereby preventing movements of the ladder-mounted ledge during the use.

2. The ladder-mounted ledge of claim 1, wherein the one or more locking units comprise at least one of clamps, clips, latches and thereof.

3. The ladder-mounted ledge of claim 1, wherein the plurality of slots comprise a variety of shapes includes at least one of circle, triangle, square, rectangle, oval, and diamond.

4. The ladder-mounted ledge of claim 1, wherein the plurality of slots is configured to hold the plurality of items that include various work tools, equipment, power tools, screwdrivers, hammers, paint brushes, and thereof.

5. The ladder-mounted ledge of claim 1, wherein the fastening assembly comprises one or more connectors, nuts and bolts, clamps hooks, and threaded inserts, wherein the fastening assembly is configured to enable a user to detachably connect the mountable accessory to said one or more accessory holes.

6. The ladder-mounted ledge of claim 1, wherein said body is made of a material includes at least one of plastic, metal, fiberglass, and wood.

7. The ladder-mounted ledge of claim 1, wherein the mountable accessory is configured with at least one compartment to hold at least one accessory, wherein the at least one accessory includes at least one of a paint can and other articles.

8. A ladder-mounted ledge, comprising:

a body having an opening defined therein, wherein said body is configured with at least two sections that are adjustably connected for altering the width of said body and said opening, wherein said body is configured to be removably attached to a ladder through said opening;

a plurality of slots disposed on said body for securely holding a plurality of items;

one or more accessory holes disposed on said body, wherein said one or more accessory holes are configured to receive and securely hold a mountable accessory through a fastening assembly; and a support assembly disposed on the bottom surface of said body, wherein the support assembly is configured to secure said body to the ladder, and prevent movements of the ladder relative to said body.

9. The ladder-mounted ledge of claim 8, wherein said at least two sections are adjustably connected to each other through a slider assembly for altering the width of said body and said opening.

10. The ladder-mounted ledge of claim 8, wherein said at least two sections are movably connected to at least two extendable platforms, wherein the at least two extendable platforms are mounted on the top surface of said body through the fastening assembly.

11. The ladder-mounted ledge of claim 8, wherein the support assembly comprises: one or more locking units configured to interlock with at least one rung of the ladder, thereby preventing movements of the ladder-mounted ledge during the use; and a ladder support brace configured to engage with a ladder cross brace of the ladder, thereby preventing movements of the ladder-mounted ledge during the use.

12. The ladder-mounted ledge of claim 11, wherein the one or more locking units comprise at least one of clamps, clips, latches and thereof.

13. The ladder-mounted ledge of claim 8, wherein the plurality of slots comprise a shape includes at least one of circle, triangle, square, rectangle, oval, and diamond.

14. The ladder-mounted ledge of claim 8, wherein the plurality of slots is configured to hold the plurality of items that include various work tools, power tools, screwdrivers, hammers, paint brushes, and thereof.

15. The ladder-mounted ledge of claim 8, wherein the fastening assembly comprises one or more connectors, nuts and bolts, clamps hooks, and threaded inserts, wherein the fastening assembly is configured to enable a user to detachably connect the mountable accessory to said one or more accessory holes.

16. The ladder-mounted ledge of claim 8, wherein said body is made of a material includes at least one of plastic, metal, fiberglass, and wood.

17. The ladder-mounted ledge of claim 8, wherein the mountable accessory is configured with at least one compartment to hold at least one accessory, wherein the at least one accessory includes at least one of a paint can, and other articles.

18. A ladder-mounted ledge, comprising:

a body having an opening defined therein, a top surface, a bottom surface, a front section, and a rear section, wherein said body is configured to be removably attached to a ladder through said opening, with a ladder head positioned above the top surface of said body and ladder rungs positioned below the bottom surface of said body: a hinge assembly configured to movably attach the front section to the rear section, thereby allows the ladder-mounted ledge to change from a fold position to a unfold position;

a plurality of slots disposed on said body for securely holding a plurality of items; and one or more accessory holes disposed on said body, wherein said one or more accessory holes are configured to receive and securely hold a mountable accessory through a fastening assembly.

* * * * *